(12) United States Patent
Slama

(10) Patent No.: US 10,764,484 B2
(45) Date of Patent: Sep. 1, 2020

(54) IMAGING SYSTEM

(71) Applicant: SMR Patents S.à.r.l., Luxembourg (LU)

(72) Inventor: Alexander Slama, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/145,695

(22) PCT Filed: Mar. 27, 2017

(86) PCT No.: PCT/EP2017/057228
§ 371 (c)(1),
(2) Date: Sep. 28, 2018

(87) PCT Pub. No.: WO2017/174392
PCT Pub. Date: Oct. 12, 2017

(65) Prior Publication Data
US 2019/0132500 A1    May 2, 2019

(30) Foreign Application Priority Data
Apr. 4, 2016   (DE) .................. 10 2016 106 126

(51) Int. Cl.
*H04N 5/225*   (2006.01)
*G02B 13/06*   (2006.01)
(Continued)

(52) U.S. Cl.
CPC ........... *H04N 5/2259* (2013.01); *G02B 13/06* (2013.01); *G02B 27/1066* (2013.01);
(Continued)

(58) Field of Classification Search
CPC .... H04N 5/2254; H04N 5/2259; B60R 11/04; B60R 2001/1253; G02B 27/1066; G02B 27/14
See application file for complete search history.

(56) References Cited

U.S. PATENT DOCUMENTS 8,305,204 B2   11/2012   Nagamine et al.
8,643,748 B2    2/2014   He et al.
(Continued)

FOREIGN PATENT DOCUMENTS

DE   203 09 891 U1   9/2003

OTHER PUBLICATIONS

International Search Report and Written Opinion dated Jul. 10, 2017 of International application No. PCT/EP2017/057228.

*Primary Examiner* — Daniel M Pasiewicz
(74) *Attorney, Agent, or Firm* — Jones Day

(57) ABSTRACT

An imaging system for a vehicle includes an image sensor for detecting electromagnetic radiation, a first lens unit and a second lens unit for focusing electromagnetic radiation, and at least one transflective unit, with the transflective unit being configured to project electromagnetic radiation from the first lens unit or from the second lens unit essentially perpendicularly on the image sensor, where the first lens unit has a first optical axis and the second lens unit has a second optical axis crossing the first optical axis at a crossing point, and the transflective unit is arranged between the image sensor, the first lens unit, and the second lens unit, preferably at the crossing point. A rear view display device includes at least one imaging system, and a vehicle includes at least one imaging system.

14 Claims, 3 Drawing Sheets

(51) Int. Cl.
  G02B 27/10 (2006.01)
  G02F 1/137 (2006.01)
  B60R 1/12 (2006.01)
  B60R 11/04 (2006.01)
  G02B 27/14 (2006.01)
  G02B 26/02 (2006.01)

(52) U.S. Cl.
  CPC ........... *G02F 1/137* (2013.01); *H04N 5/2254* (2013.01); *B60R 11/04* (2013.01); *B60R 2001/1253* (2013.01); *B60R 2300/602* (2013.01); *G02B 26/023* (2013.01); *G02B 27/14* (2013.01); *G02F 2203/09* (2013.01)

(56) References Cited

U.S. PATENT DOCUMENTS

| | | |
|---|---|---|
| 8,937,651 B2 | 1/2015 | Guissin et al. |
| 9,407,819 B2 | 8/2016 | Guissin et al. |
| 2009/0128664 A1* | 5/2009 | He .................. G02B 15/02 348/240.1 |
| 2010/0134264 A1* | 6/2010 | Nagamine .............. B60Q 9/005 340/435 |
| 2014/0055624 A1* | 2/2014 | Gaines ................ H04N 5/2254 348/207.1 |
| 2015/0092102 A1* | 4/2015 | Chan .................. G02B 5/08 348/360 |
| 2017/0276954 A1* | 9/2017 | Bajorins ............ G02B 27/2235 |

* cited by examiner

IMAGING SYSTEM

CROSS-REFERENCE TO RELATED APPLICATIONS

This application is a National Stage entry of International Patent Application No. PCT/EP2017/057228, filed Mar. 27, 2017, which claims the benefit of priority to German Patent Application No. DE 10 2016 106 126.3, filed Apr. 4, 2016, each of which is incorporated by reference herein in its entirety for all purposes.

BACKGROUND OF THE INVENTION

1. Field of the Invention

The following description relates to an imaging system for use in an automotive environment. The imaging system includes an image sensor for detecting electromagnetic radiation, a first lens unit and a second lens unit for focusing electromagnetic radiation, and at least one transflective unit with the transflective unit being configured to project electromagnetic radiation from the first lens unit and/or from the second lens unit essentially perpendicularly on the image sensor.

2. Related Art

In modern day vehicles, conventional mirrors are often replaced with camera based systems. It has been recognized that the vehicle mirrors currently used have several disadvantages. Conventional mirrors often offer the driver a very limited perspective on the environment of the vehicle's so-called "blind spots" which can only be compensated through additional mirrors. Also, vehicle mirrors have a negative impact on the design and the aerodynamic characteristics of the vehicle. Therefore, vehicles often employ vision systems where the images of cameras on the left-hand side, right-hand side, the front and the back of the vehicle are presented to the driver instead of employing conventional mirrors. For example, such a system is described in DE 19951376 A1.

These systems which employ multiple cameras are able to provide the driver with the required information about the surroundings of the vehicle; however, these solutions are very costly. As of today, separate cameras, i.e. at least two cameras employing two lenses, two housings, two image sensors, two controllers and two connectors with corresponding wiring, are necessary for surround view and mirror replacement. This leads to complex and costly solutions.

Stereo camera systems are well known in the prior art and make use of two lens units being arranged parallel to each other, see e.g. US 2010/0283837 A1 and DE 10 2013 221 581 A1. In addition, beam splitters making use of polarization filters are well known, see e.g. WO 00/72079 A2.

An electronic optical zoom system according to US 2009/0128664 A1 includes a first lens assembly and a second lens assembly. The first lens assembly and the second lens assembly may be adjacently disposed or concentrically disposed. The first lens assembly and second lens assembly, in one embodiment, have different magnification configurations. An image sensor captures electronic images of a subject. Optical zoom capability is achieved by an alterable electronic optical device, such as a switchable mirror. The alterable electronic optical device selectively redirects received light between a first optical path from a reflective surface to a second optical path from the alterable electronic optical device depending upon the state of the alterable electronic optical device. The electronic optical zoom system thereby provides optical zoom capabilities in a compact package without the need for physically moving lens assemblies.

US 2014/0132804 describes an imaging device which includes a multidirectional imaging unit defining a plurality of fields of view (FOVs), a sensor unit, and guiding optics. The multidirectional imaging unit is configured for collecting a plurality of electromagnetic (EM) radiation portions from a plurality of scenes, each scene being imaged with a respective FOV. The sensor is configured for receiving EM radiation and generating image data indicative thereof. The guiding optics is configured for receiving at least a part of the collected EM radiation portions and directing them onto the sensor unit.

An improved imaging system that requires less parts while providing high quality images is described. In particular, the known imaging systems are further developed to overcome drawbacks of the prior art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. In one aspect, a mounting assembly for an exterior attachment device which offers particularly good protection against theft of such external attachment devices is described.

In an aspect, a first lens unit has a first optical axis and a second lens unit has a second optical axis crossing the first optical axis at a crossing point, and a transflective unit is arranged between an image sensor, the first lens unit and the second lens, preferably at the crossing point.

Here, the term "imaging system" can be used interchangeably with the term "camera", or "camera system". Also, the term "electromagnetic radiation" can be used to refer to visible light, but can also be used to refer to invisible electromagnetic radiations, such as infrared light, etc. The term "transflective unit" can be used to refer to a unit that includes at least one transflector, that can operate in a reflective mode and/or in a transmissive mode depending on a corresponding input signal that is applied to the transflective unit. The term "image sensor" can be used to refer to a device that is able to detect and convey information that constitutes an image. Also, the wording "projecting electromagnetic radiation essentially perpendicularly on the at least one image sensor" can be defined as projecting electromagnetic radiation with an incidence angle of 0° or close to 0° on the at least one image sensor.

The two lens units may be arranged not parallel to each other as known from stereo cameras, but rather such that their optical axes cross each other, with the respective crossing point being arranged in the region of the transflective unit which, therefore, is arranged between the image sensor, the first lens unit and the second lens.

The transflective unit may include at least one first shutter-glass having a reflective mode and a transmissive mode, with preferably the optical axis of the first shutter-glass crossing the first and the second optical axes in their crossing point within the first shutter-glass. For example, the shutter-glasses may include a liquid crystal layer which has the property of becoming opaque and reflective when voltage is applied, being otherwise substantially transparent.

The at least one first shutter-glass may be inclined relative to the image sensor to project electromagnetic radiation from the first lens unit on the image sensor by transmitting the electromagnetic radiation from the first lens unit, and/or to project electromagnetic radiation from the second lens unit on the image sensor by reflecting the electromagnetic radiation from the second lens unit.

The transflective unit may include a second shutter-glass, where the second shutter-glass may be arranged between the first lens unit and the first shutter-glass to control transmission of electromagnetic radiation from the first lens unit to the first shutter-glass.

The imaging system may further include a control unit, where the control unit is adapted to supply a control signal to the at least one first shutter-glass and/or to the at least one second shutter-glass.

The control signal may have a frequency, f, causing the first and second shutter-glasses to switch between a reflective and a transmissive mode.

The control signal may be adapted to simultaneously switch the first and second shutter glasses to the reflective mode and/or to the transmissive mode, or to alternately switch one shutter-glass to the reflective mode, while the other shutter-glass is switched to the transmissive mode. Here, the term "simultaneously" can be used to refer to a situation where both shutter-glasses have the same mode at the same time, i.e. both are set to reflective, or both are set to transmissive.

The imaging system may include at least one third lens unit with a third optical axis crossing the first and/or the second optical axes, preferably at a crossing point.

The first lens unit, the second lens unit and/or the third lens unit may have different field of views, preferably one of the first and second lens units having a narrow aperture, while the other lens unit having a wide aperture, preferably the first lens unit has an aperture of 40° and/or the second lens unit has an aperture of 180°, preferably the first lens unit includes a surround-view lens and the second lens unit includes a camera-monitor lens.

The first, second and/or third lens unit may include at least one optical lens each.

The first, second or third optical axis may fall together with the optical axis of the image sensor.

The imaging system may be adapted to be arranged in a camera housing.

The image sensor may include a semiconductor charge-coupled device, CCD, or an active pixel sensor.

The imaging system may further include a housing, an electronics unit, and/or a video cable.

In another aspect, a rear view display device for a vehicle, preferably for a motor vehicle, includes at least one imaging system.

In yet another aspect, a vehicle may include at least one imaging system.

At least one advantage is in providing one highly integrated camera with at least two lenses, but not in form of a stereo camera, but for a multi-view application. This leads to lower production costs, since less components need to be utilized, such as just one optical sensor, just one controller and just one electrical interface. Therefore, less wiring is needed to connect the imaging system to a main control system of a vehicle.

Also, another advantage is that projecting electromagnetic radiation from the first lens unit and/or from the second lens unit essentially perpendicularly on the at least one image sensor allows utilization of the entire sensor for information from one lens unit at certain time instances. This leads to enhanced image quality and more information (higher resolution) in the field of view of the lenses having a narrow opening angle compared to the field of view of the lenses having a wide opening angle.

The imaging system may be used for multi-view applications of the vehicle interior and rear seats as well as for obtaining further views of the vehicles trailer hitch, for bird-view applications as well as for curb stone detection. Also, the respective views can be magnified when displayed to the driver. The image system can be used for different purposes in parallel like camera monitor systems with or without detection and overlays as well as for surround view systems with or without detection and overlays.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1A:
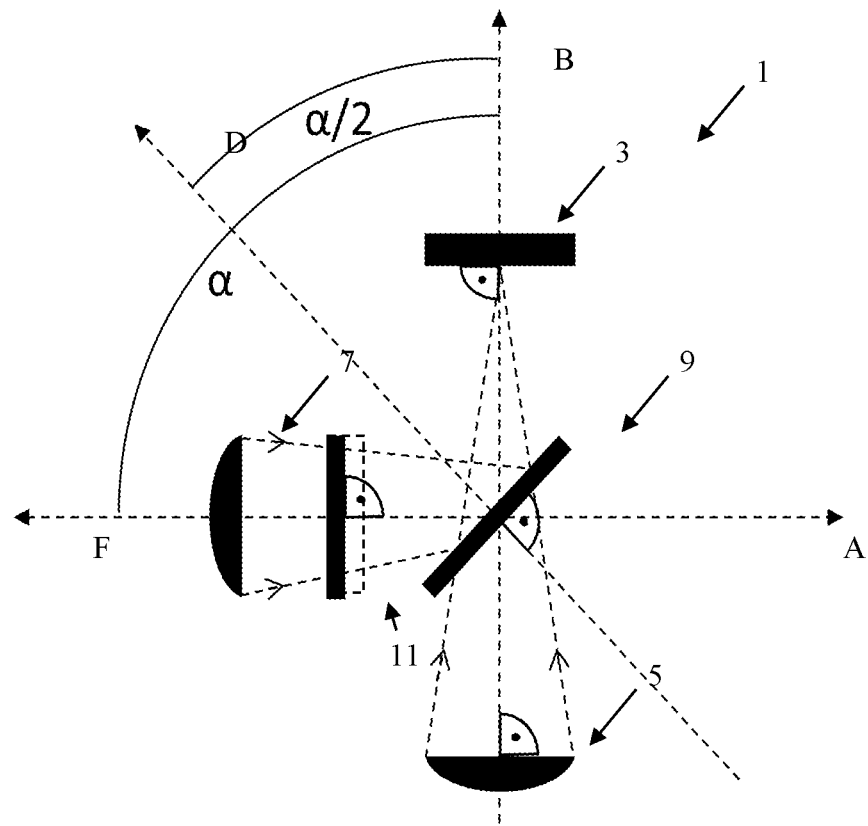
FIGS. 1a, 1b, and 1c are diagrams illustrating a schematic plan view, a schematic side view and a schematic front view of an example of an imaging system.
Figure 1B:
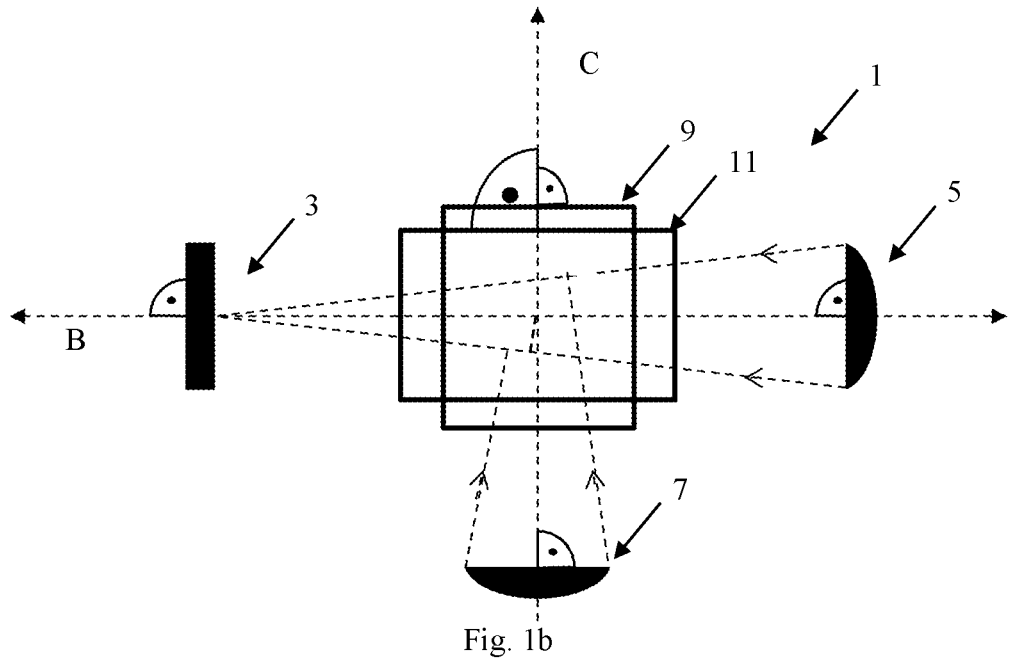
Figure 1C:
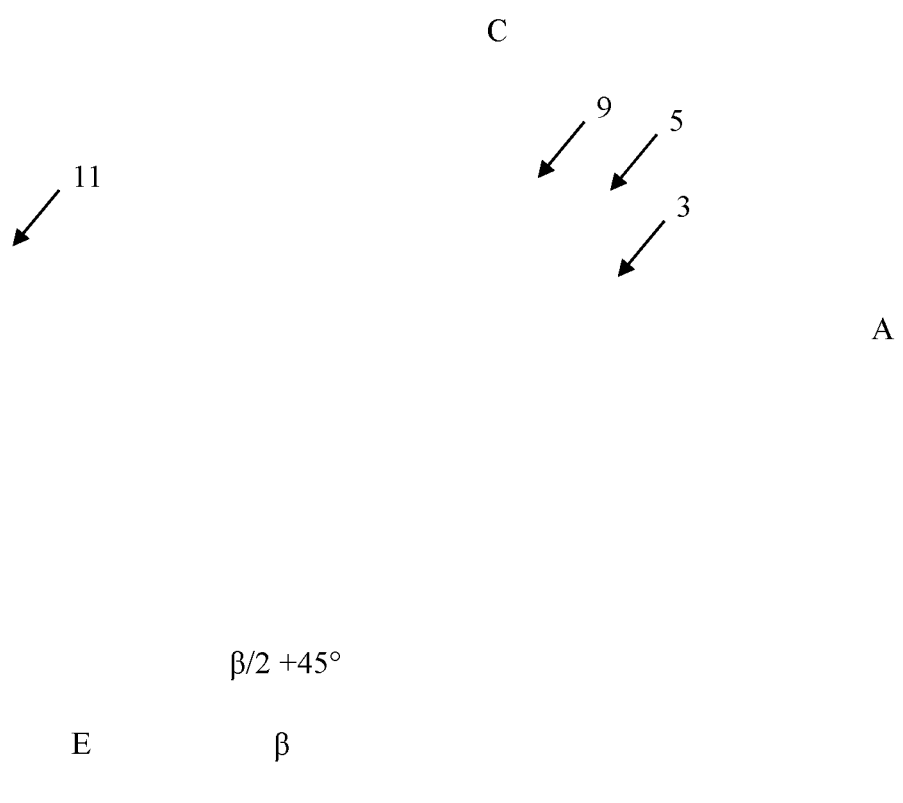

The imaging system 1, according to an embodiment and as illustrated in FIGS. 1a, 1b and 1c, includes an image sensor 3, a first lens unit 5 with a first optical axis falling together with the optical axis of the image sensor 3, a second lens unit 7 with a second optical axis running perpendicularly to the first optical axis, a first shutter-glass 9, and a second shutter glass 11. The grid system that is shown by means of dotted lines only serves for the purpose of explaining the spatial orientation of the individual components of the imaging system 1 relative to each other via the optical axes. Thereby, the axes marked A, B, and C are oriented at an angle of 90° relative to each other. In the shown embodiment, the first lens unit 5 could be a camera monitor lens having a field of view of 40°, whereas the second lens unit 7 could be a surround view lens having a field of view of 180°, or vice versa. The optical axes of the two lens units 5, 7 may cross each other within the first shutter-glass 9, namely on the optical axis of the first shutter-glass 9 as can be seen in FIG. 1a.

Thus, from FIGS. 1a and 1b it can be seen that the first lens unit 5 may be oriented opposite of the image sensor 3, i.e. oriented at an angle of 180° relative to the image sensor 3. Electromagnetic radiation that is focused by the first lens unit 5 can be projected directly onto the image sensor 3 by passing through the first shutter-glass 9 that is arranged at an angle of 45° in the optical path between the image sensor 3 and the first lens unit 5. When the first shutter-glass 9 is in a transmissive mode, the electromagnetic radiation can freely propagate through the first shutter-glass 9, whereas when the first shutter-glass 9 is in a reflective mode, an essential part of the electromagnetic radiation cannot propagate through the first shutter-glass 9. The skilled person would know that switching between the modes can be done by applying and removing an electric signal to the first shutter-glass 9.

FIGS. 1*a* and 1*b* also show that a second lens unit 7 may be arranged at an angle of a relative to the image sensor 3. In the shown embodiment, the second lens unit 7 is arranged at an angle of α=90° relative to the image sensor 3, where α=∠BF, and α/2=∠BD. As it can be seen from FIG. 1*a*, the first shutter-glass 9 is arranged at an angle of 45° relative to the second lens unit 7 and to the image sensor 3. When the first shutter-glass 9 is in the reflective mode, electromagnetic radiation from the second lens unit 7 may be reflected by the first shutter-glass 9 at an angle of 90° onto the image sensor 3.

The angle α can in principle take any absolute value above zero and up to 90°, i.e. the angle may vary as long as it differs from zero and allows for a crossing of the first and second optical axes.

In order to enhance the operation of the imaging system 1, a second shutter-glass 11 is shown that is arranged between the second lens unit 7 and the first shutter-glass 9. Also, in FIG. 1 a dotted line around the second shutter-glass 11 indicates that the second shutter-glass 11 could be located in an oblique plane.

Further, the second shutter-glass 11 can be switched so that the second shutter-glass 11 is in the transmissive mode when the first shutter glass 9 is also in the transmissive mode and vice versa. This allows to alternately project electromagnetic radiation substantially exclusively either from the first lens unit 5 or from the second lens unit 7 onto the image sensor 3. Correspondingly, an evaluation unit (not shown) that could be connected to the image sensor 3 could alternately obtain and evaluate image signals corresponding to the electromagnetic radiation from either the first lens unit 5 or the second lens unit 7 with a frequency f that corresponds to the switching frequency between the transmissive and reflective modes.

In FIG. 1*c*, a front view of the imaging system 1 is shown. In the shown embodiment, the second lens unit 7 may also be arranged at an angle β, where R=∠CF, and β/2+45°=∠CE. For the cases where α=180°, the first shutter-glass 9 does not need to be employed, and where β=270°, the second shutter-glass 11 does not need to be employed. As can be seen from FIG. 1*c*, the second optical axes of the second lens unit 7 may cross the optical axis of the second shutter-glass 11 within the second shutter-glass 11.

Figure 2:
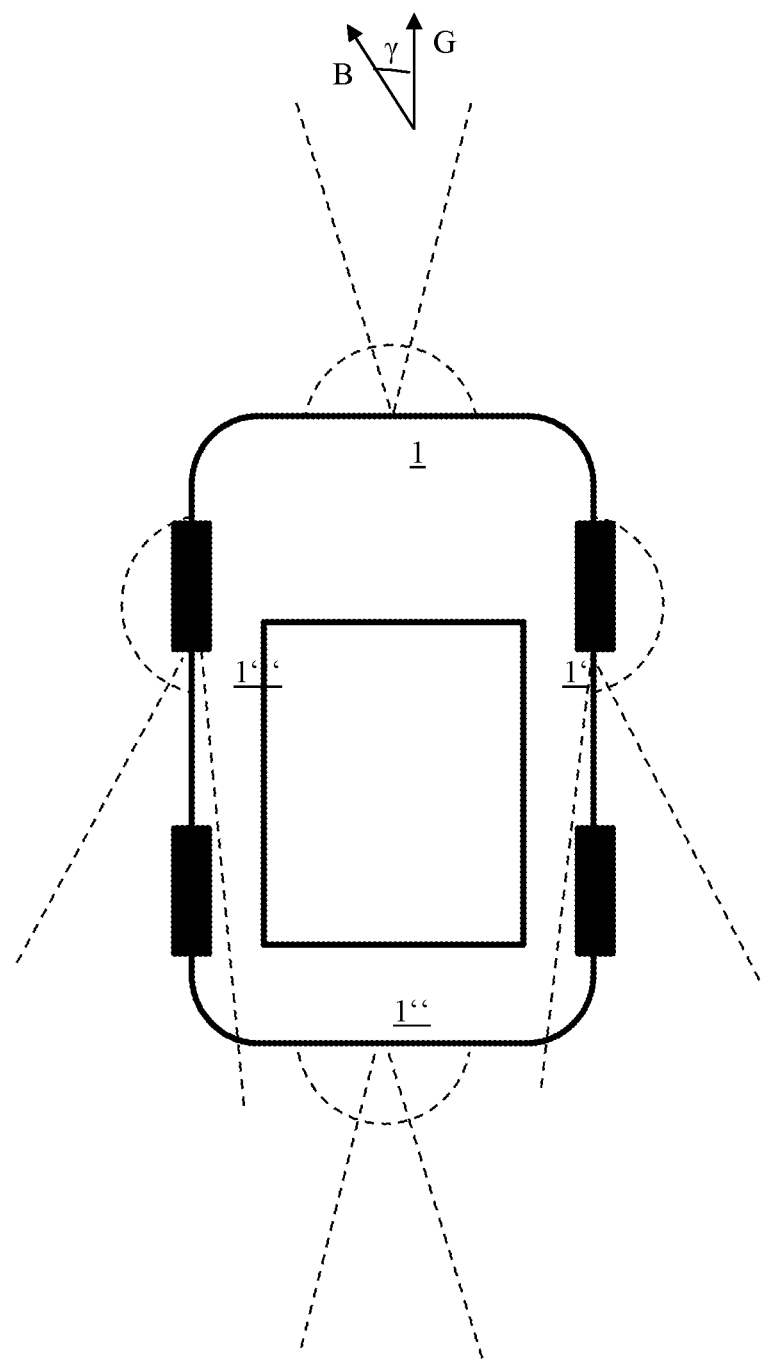
FIG. 2 is a diagram illustrating a schematic view of an example of a vehicle having imaging systems installed in various locations.
Figure 1C:
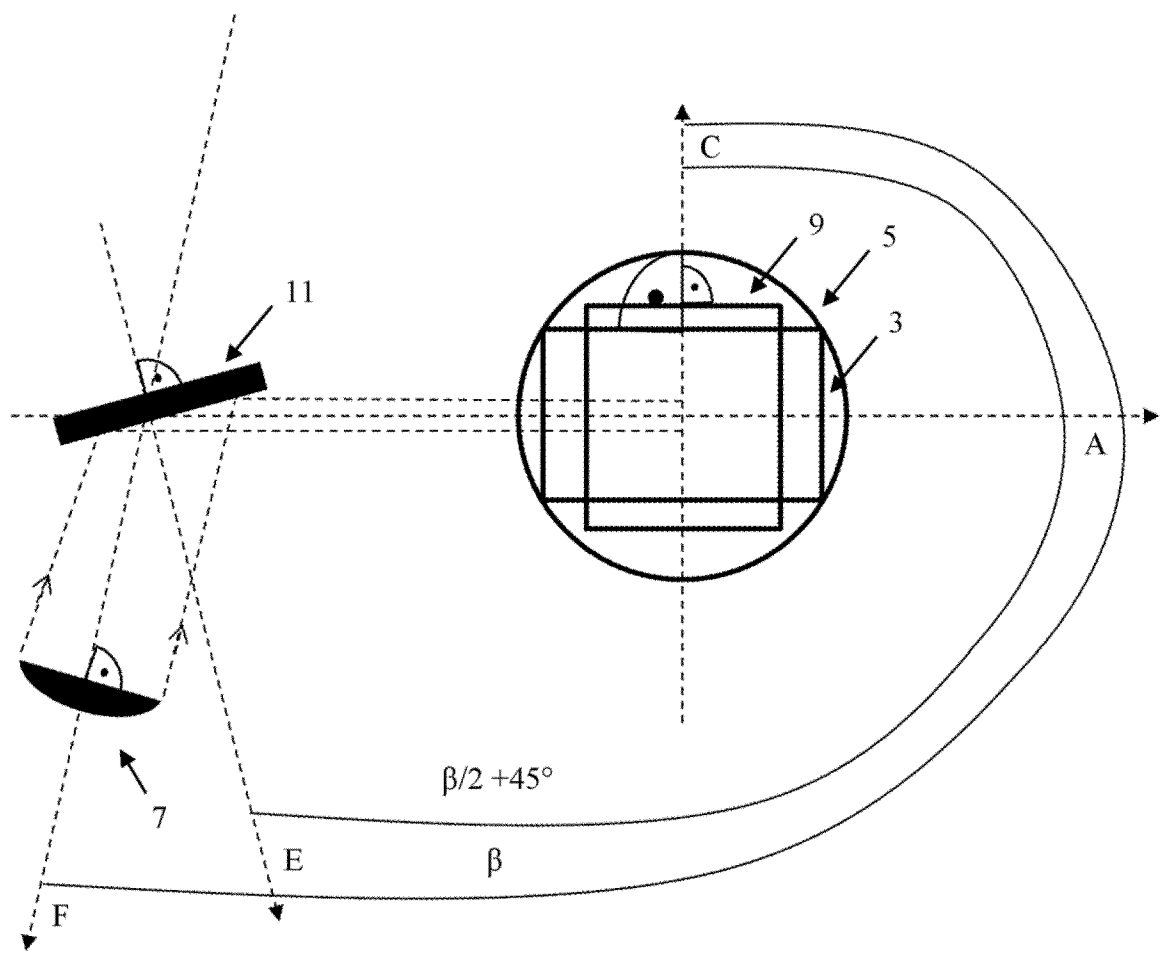

In FIG. 2, a schematic view of a vehicle is shown having four imaging systems 1, 1', 1", 1''' according to embodiments installed in various locations. In the shown embodiment, the first lens unit 5 of the imaging systems 1, 1', 1", 1''' may be a camera monitor lens having a field of view of 40°, whereas the second lens unit 7 may be a surround view lens having a field of view of 180°. The imaging systems 1, 1', 1", 1' could be all of the type of imaging system 1 that are shown in FIGS. 1*a*, 1*b*, and 1*c*. For example, the driving direction may be depicted above imaging system 1 by means of an arrow G for the shown imaging systems 1, 1', 1", 1'''. The orientation angle of the camera monitor lens may be depicted by γ, where γ=∠GB and the wedge shaped dotted lines indicate the viewing angle of the camera monitor lens, whereas the viewing angle of the surround view lens is depicted by the dotted half circle.

In the shown example, imaging system 1 may be configured so that α=180°, β=225°, γ=0°, imaging system 1' may be configured so that α=320°, β=225°, γ=+15°, imaging system 1" may be configured so that α=180°, β=225°, γ=180°, and imaging system 1''' may be configured so that α=60°, β=225°, γ=−15°.

However, the skilled person would know that more or less imaging systems 1, 1', 1", 1''' could be installed on the exterior or interior of the vehicle.

It will be appreciated by those skilled in the art that changes could be made to the embodiments described above without departing from the broad inventive concept thereof. It is understood, therefore, that the invention disclosed herein is not limited to the particular embodiments disclosed, and is intended to cover modifications within the spirit and scope of the present invention.

REFERENCE SIGNS

1, 1', 1",1''' imaging system
3 image sensor
5 first lens unit
7 second lens unit
9 first shutter-glass
11 second shutter-glass
A, B, C, D, E, F, G reference axes
α, β, γ reference angles

What is claimed is:

1. An imaging system for a vehicle, comprising:
an image sensor for detecting electromagnetic radiation;
a first lens unit and a second lens unit for focusing electromagnetic radiation; and
at least one transflective unit, with the at least one transflective unit being configured to project electromagnetic radiation from at least one of the first lens unit and the second lens unit essentially perpendicularly on the image sensor, the at least one transflective unit comprising at least one transflector that can operate in at least one of a reflective mode and a transmissive mode depending on a corresponding input signal that is applied to the at least one transflective unit, wherein
the first lens unit has a first optical axis and the second lens unit has a second optical axis crossing the first optical axis at a crossing point, and
the at least one transflective unit, which is arranged between the image sensor, the first lens unit, and the second lens unit at the crossing point, comprises
at least one first shutter-glass having a reflective mode and a transmissive mode, with the optical axis of the at least one first shutter-glass crossing the first and the second optical axes in the crossing point within the at least one first shutter-glass; and
at least one second shutter-glass, the at least one second shutter-glass being arranged between the first lens unit and the at least one first shutter-glass to control transmission of electromagnetic radiation from the first lens unit to the at least one first shutter-glass, and the at least one second shutter-glass is at least partially at the crossing point of the first optical axis of the first lens unit and the second optical axis of the second lens unit.

2. The imaging system of claim 1, wherein the at least one first shutter-glass is inclined relative to the image sensor in order to at least one of project electromagnetic radiation from the first lens unit on the image sensor by transmitting the electromagnetic radiation from the first lens unit, and project electromagnetic radiation from the second lens unit on the image sensor by reflecting the electromagnetic radiation from the second lens unit.

3. The imaging system of claim 1, further comprising a control unit, wherein the control unit is adapted to supply a control signal to at least one of the at least one first shutter-glass and the at least one second shutter-glass.

4. The imaging system of claim 3, wherein the control signal has a frequency, f, causing the first and second shutter-glasses to switch between a reflective and a transmissive mode.

5. The imaging system of claim 4, wherein the control signal is adapted to simultaneously switch the at least one first and at least one second shutter glasses to the reflective mode or to the transmissive mode, or
to alternately switch one of the at least one first and at least second shutter glasses to the reflective mode, while the other of the at least one first and at least second shutter glasses is switched to the transmissive mode.

6. The imaging system of claim 1, further comprises at least one third lens unit with a third optical axis crossing at least one of the first and the second optical axes at the crossing point.

7. The imaging system of claim 6, wherein at least one of the first lens unit, the second lens unit, and the third lens unit have different field of views, wherein one of the first and second lens units have a narrow aperture while the other has a wide aperture, at least one of the first lens unit has an aperture of 40° and the second lens unit has an aperture of 180°, and the first lens unit comprises a surround-view lens and the second lens unit comprises a camera-monitor lens.

8. The imaging system of claim 6, wherein at least one of the first, the second, and the third lens unit comprise at least one optical lens.

9. The imaging system of claim 6, wherein the first, the second, or the third optical axis falls together with the optical axis of the image sensor.

10. The imaging system of claim 1, wherein the imaging system is adapted to be arranged in a camera housing.

11. The imaging system of claim 1, further comprising a semiconductor charge-coupled device (CCD), or an active pixel sensor.

12. The imaging system of claim 1, further comprising at least one of a housing, an electronics unit, and a video cable.

13. A rear view display device for a vehicle, comprising at least one imaging system of claim 1.

14. A vehicle, comprising at least one imaging system of claim 1.

* * * * *

UNITED STATES PATENT AND TRADEMARK OFFICE
CERTIFICATE OF CORRECTION

| | |
|---|---|
| PATENT NO. | : 10,764,484 B2 |
| APPLICATION NO. | : 16/145695 |
| DATED | : September 1, 2020 |
| INVENTOR(S) | : Alexander Slama |

It is certified that error appears in the above-identified patent and that said Letters Patent is hereby corrected as shown below:

In the Drawings

Correct Figure 1C with the correct figure which is attached.

Signed and Sealed this
Seventeenth Day of November, 2020

Andrei Iancu
*Director of the United States Patent and Trademark Office*